United States Patent [19]

Bonnemay et al.

[11] 4,115,628
[45] Sep. 19, 1978

[54] ELECTRODE COMPRISING A NICKEL BASED CATALYST FOR ELECTROCHEMICAL GENERATORS

[75] Inventors: Maurice Bonnemay, Boulogne-Billancourt; Guy Bronoël, Versailles; Lysiane Angély; Gilbert Peslerbe, both of Meudon la Foret, all of France

[73] Assignee: Agence Nationale de Valorisation de la Recherche (ANVAR), Neuilly sur Seine, France

[21] Appl. No.: 647,987

[22] Filed: Jan. 9, 1976

[30] Foreign Application Priority Data

Jan. 10, 1975 [FR] France .............................. 75 00722

[51] Int. Cl.² ............................................. H01M 4/86
[52] U.S. Cl. ..................................................... 429/44
[58] Field of Search ...................... 136/120 FC, 86 D; 423/124, 115; 204/2.1; 252/182; 429/40, 44

[56] References Cited

U.S. PATENT DOCUMENTS

| 3,341,936 | 9/1967 | Sanstede et al. | 136/86 D |
| 3,347,708 | 10/1967 | Drengler | 136/86 D |
| 3,497,425 | 2/1970 | Cotton et al. | 136/86 D |

FOREIGN PATENT DOCUMENTS

| 859,053 | 5/1940 | France. |
| 1,103,442 | 2/1968 | United Kingdom. |

Primary Examiner—John H. Mack
Assistant Examiner—H. A. Feeley
Attorney, Agent, or Firm—Cushman, Darby & Cushman

[57] ABSTRACT

The invention relates to an improved electrode for an electrochemical generator, said electrode enabling the electrochemical oxidation of hydrogen supplied of the interface of said electrode and an electrolyte. It comprises a nickel-based catalyst formed of particles or crystallites the sizes of which range from about 20 to about 130 Angströms.

23 Claims, 2 Drawing Figures

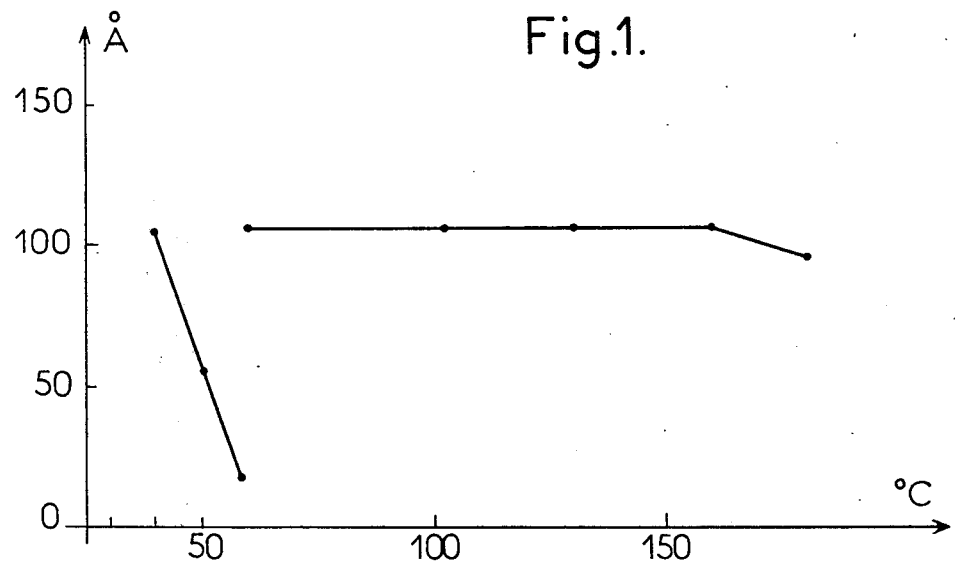
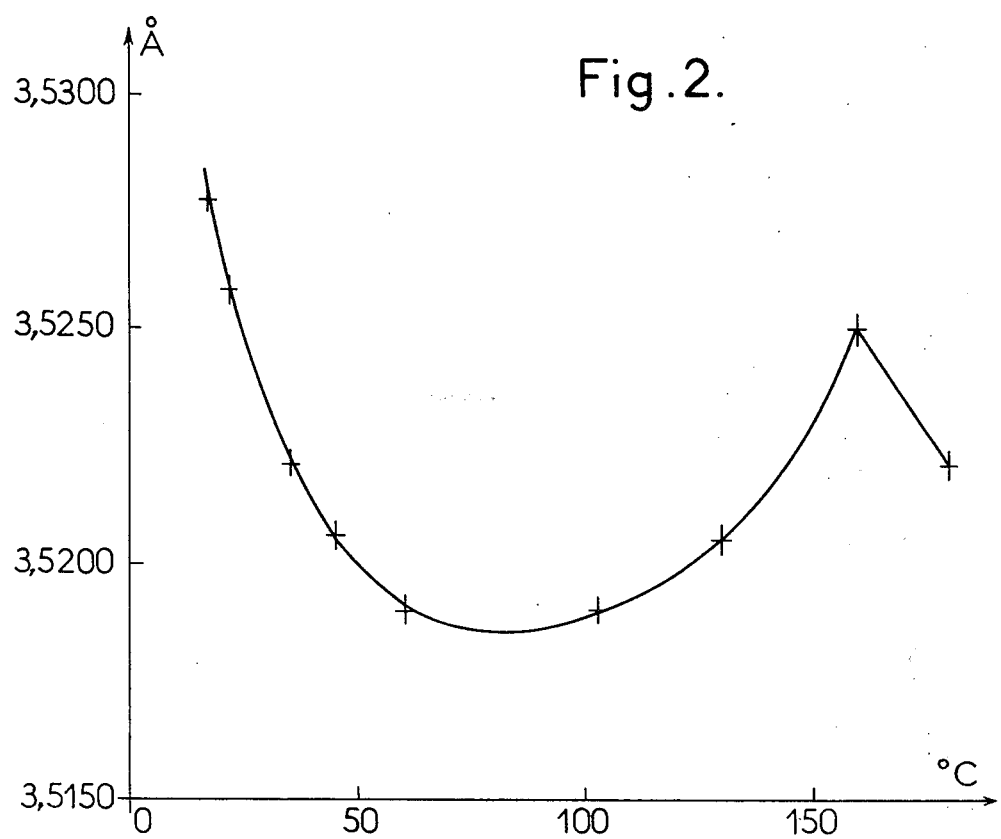

ELECTRODE COMPRISING A NICKEL BASED CATALYST FOR ELECTROCHEMICAL GENERATORS

The invention relates to a new catalyst for the chemical oxidation of hydrogen. More particularly it relates to a new nickel-based electrode catalyst, adapted notably to facilitate the electrochemical oxidation of hydrogen, more particularly of molecular hydrogen into $H^+$ ions, preferably at a temperature in the neighbourhood of ambiant temperature and in an alkaline medium.

It relates more especially to electrodes for electrochemical generators and applying this electrochemical reaction, for the production of an electric current. Such electrochemical generators include at least one positive electrode and at least one negative electrode respectively in contact with an electrolyte and wherein a molecular hydrogen is supplied at the interface of the negative electrode and the electrolyte. The catalyst facilitating the electrochemical oxidation of the hydrogen is generally incorporated with the negative electrode. Advantageously, but not exclusively, negative electrodes of this type cooperate with a positive electrode, supplied with oxygen, which undergoes electrochemical reduction at the positive electrode-electrolyte interface, the electrochemical generators so constituted forming "fuel cells".

Fuel cells are currently being widely developed, but their development has been retarded notably by the small number of electrode catalysts, notably electrochemical oxidation catalysts for hydrogen, which are efficient, stable and of a reasonable cost.

The majority of catalysts hitherto proposed are constituted from platinum or from palladium, mostly in a dispersed form on carbon. Unfortunately, in spite of research carried out to reduce the amounts of the metal necessary for the production of electrodes, their high price, as well as their scarceness does not permit their use to be contemplated in the mass production of fuel cells.

There have also been proposed for use as catalysts nickel based compounds, for example "ex-Raney" nickel (obtained by the action of a concentrated alkaline medium, on the nickel-aluminum alloy called "Raney alloy"), or again nickel borides. Such catalysts are less expensive than those based on platinum or on palladium. Unfortunately, because of the drawbacks which they exhibit, these nickel-based catalysts are but scarcely suitable for large scale industrial use. They are firstly much less active than platinum or palladium, but especially they cannot withstand high anodic polarization. For example, a relative over-voltage of 150 mV, applied for some minutes to an electrode including "ex-Raney nickel", causes it to lose irremediably its electrocatalytic properties with respect to hydrogen. This loss in activity seems due to an irreversible surface oxidation of the "ex-Raney" nickel. Thus, a battery constituted from elements including such electrodes, could only be used under well-defined conditions and would risk irremediable deterioration by the accidental appearance of anodic over-voltages.

It is therefore a particular object of the invention to overcome these drawbacks and especially to provide electrodes including a nickel-based catalyst which is less susceptible, if not incapable, of being oxidized irreversibly under the action of accidental anodic over-voltages.

It is another object of the invention to provide electrodes of which the catalyst has very considerable catalytic activity, even greater than that of previously known nickel-based catalysts with respect to the electrochemical oxidation of molecular hydrogen.

According to the invention, an electrochemical generator electrode enabling the electrochemical oxidation of hydrogen in contact therewith, comprises an electrically conducting support and, deposited on this support or incorporated with this support, a nickel-based catalyst, wherein the said catalyst is formed of particles or crystallites whose sizes are advantageously comprised between about 20 and about 130 Å and preferably comprise between about 30 and about 120 Å. The electrode catalyst so obtained is not oxidizable, or is at most, oxidizable reversibly under the action of anodic over-voltages.

The electrode catalyst according to the invention may be obtained by vaporization under vacuum of nickel and condensation of the nickel vapor on a substrate under the well-defined conditions of pressure and of temperature of the substrate.

The lattice parameter of the nickel in the catalyst is generally comprised between about 3.5170 Å and 3.5210 Å and notably it is less than 3.5200 Å and preferably comprised between about 3.5185 Å and about 3.5195.

In certain cases, however, this lattice parameter is comprised between 3.5400 Å and 3.5470 Å, notably when the nickel-based catalyst is obtained by condensation of nickel vapor on a substrate based on vitreous carbon (a high polymer of carbon which is very electrically conducting, more coherent and more chemically resistant than the usual graphites).

It has been observed that in electrodes according to the invention, the nickel particles retain but little hydrogen, or even more in their networks, when they are subjected to cathodic polarization in the presence of hydrogen.

The degree of organization of the deposit and, consequently to a large extent, the favorable behaviour of the catalyst with respect to surface oxido-reduction phenomena, depends on the temperature at which the substrate was maintained during the condensation as well as the nature and the state of the surface of the latter.

The degree of organization or order of the structure of the deposit can be assessed by X-ray analysis (Debye-Scherrer diffractogram).

A preferred method for obtaining nickel catalysts consists of evaporating nickel, under vacuum of $10^{-5}$ to $10^{-6}$ torr, for the purpose of lowering the nickel vaporization temperature, and of condensing the nickel vapor in the form of a deposit on a substrate generally brought to a temperature comprised between about 50° and about 120°–130° C, preferably of the order of 90° C, that is to say, a temperature of 80° to 90° C.

In the case where the substrate is based on vitreous carbon, the temperature of the substrate is 90° to 170° C and preferably of the order of 140° C.

It is observed with a majority of substrates (except for vitreous carbon) that, when the nickel vapor is condensed on a substrate brought to a temperature below about 50° C or above about 130° C, the deposits obtained have a lattice parameter which tends to become higher at 3.5200 Å. However, these nickels, although electrochemically reactive, especially those obtained at a temperature above 130° C, resist anodic oxidation poorly.

It is possible to effect the evaporation of the nickel notably by bringing a block of pure nickel to boiling point by electronic bombardment, or again by the Joule effect, the speed of deposition being for instance of about $20 \times 10^{-3}$ g/min.

The particles or crystallites of the catalyst are constituted by microcrystals of 20 to 130 Å, advantageously from 30 to 120 Å and this whatever the condensation temperature of the nickel on its substrate.

However, with the majority of substrates, the deposits obtained at temperatures below 60° C are constituted by microcrystallites dispersed in a pseudoamorphous matrix wherein the order of the atoms is not respected on more than small distance (some tens of Å) contrary to what exists in a crystalline structure. Beyond 60° C the crystalline structure is more and more extended, the nickel atoms being displaced to occupy well-determined positions identical with those that they would occupy in a crystal of large size.

Towards 90° C, the deposit being at this temperature almost entirely constituted by crystallites of 120 Å, an interesting phenomenon is to be noted: the lattice parameter has reached its minimum dimension of the order of 3.5185 Å, which induces compression strains of 30 kg/mm$^2$.

Beyond 90° C, the strains are gradually released and the lattice parameter develops towards that of solid nickel (in the neighborhood of 120° C, it is of the order of 3.5200 Å).

The substrate is constituted, either by the material of the electrode itself, for example powdered, or vitreous carbon, or by a material which can notably be subsequently separated easily from the catalyst formed.

In a preferred embodiment of the method according to the invention, the substrate is constituted by a material which can be eliminated, for example by selective solution in a medium in which nickel is not soluble. For example, the material constituting the substrate is constituted by aluminum in a solid state or as powder, which can then be dissolved selectively, in an alkaline solvent, such as potassium hydroxide. It may be constituted by an organic compound capable of being brought to a temperature comprised between the above-indicated preferred range and at which it is not damaged, the deposited nickel being then recovered by selective solution of the organic compound in a solvent for the latter. As organic compound, it is possible advantageously to use cellulose, soluble in acetone, or again cellulosic films, of the type known under the trademark "CELLOPHANE", soluble in ether.

The substrate may also be constituted by a different material, for example, a metallic support, on which is then deposited firstly a layer of a material selectively separable from nickel, such as aluminum, the nickel then being deposited in its turn on the aluminum layer, under the above-defined conditions, the aluminum-nickel multilayer assembly then being separated from the substrate, for example by scraping. The nickel may then be separated from the other material (for example aluminum), as described above.

In an advantageous embodiment of this modification of the method according to the invention, the substrate is constituted by a steel tape which is continuously advanced, and aluminum and nickel are continuously deposited thereon, by vapor condensation of these metals, at two distinct points with respect to this tape, the latter being maintained at the desired temperature. It is thus possible to form two successive layers (or alternate layers in the case of a closed loop of tape revolving on itself). For example, the conditions of the deposit (the speed of advance of the tape, ratio of vaporization and condensation, respectively of these metals, etc.) are adjusted to obtain layers having thickness of the order of 250 Å for nickel, and of the order of 50 Å, for aluminum.

The separation of the layers, notably by scraping, may be effected continuously also, nickel then being recovered by selective solution of the powders obtained, notably in potassium hydroxide.

The powdered nickel is obtained in all cases, in the form of very small crystallites when the above-indicated ranges of partial pressures and of temperatures are used. This powdered nickel is distinguished by a higher resistance to oxidation than conventional nickel, this oxidation, when not completely avoidable, having nonetheless a marked property of reversibility.

In addition, thermal treatment (annealing) carried out on nickel-based catalysts for electrodes according to the invention although tending to cause an increase in the size of the particles or crystallites can have a favorable effect on the catalyst by imparting to it a greater degree of organization. It may consequently be advantageous, in certain cases, to subject the catalyst to "annealing" under conditions such that good catalytic activity is preserved (the size of the particles or crystallites increasing little yet not above the maximum limits indicated above) and so that, besides, the resistance of the catalyst with respect to oxidation is improved due to a better organized structure.

It is self-evident that it is advantageous, in the case of manufacture of nickel-based catalysts on the industrial scale, to produce nickels having a specific surface as high as possible, in order to obtain catalytic activity which is also as high as possible.

The incorporation of this nickel powder in the material of the electrode (constituted, for example by powdered carbon or polytetrafluorethylene), may as necessary, after prior grinding to increase the fineness further, be produced in any manner known in itself, notably by homogeneous mixing with the electrode material, which is, for example, constituted by a powder of carbon or of polytetrafluorethylene.

Other features of the invention will appear also in the course of the description which follows, of manufacturing tests of a nickel catalyst having the characteristics according to the invention, and from the results which have been obtained, among others with respect to the drawing in which:

FIG. 1 shows variations in sizes of the crystallites of nickel deposits (obtained by application of the method according to the invention described in Example I which follows) as a function of the temperature of the substrate on which these deposits have been made and FIG. 2 shows the variations in the average lattice parameter of the nickel of these same deposits as a function of the temperature of the substrate.

EXAMPLE I

For the purpose of studying the physico-chemical properties of the catalysts according to the invention, deposits of nickel are produced in a vacuum installation ($10^{-5}$ to $10^{-6}$ torr), on substrates constituted from an "epoxy" type resin, such as that known by the name of "Araldite", containing twice its weight of "ex-carbonyl" nickel, that is to say nickel obtained by the thermal decomposition of nickel carbonyl, at various temperatures ranging from 30° to 180° C. In these experiments, substrates are respectively maintained at selected temperatures, with an accuracy of the order of ± 2° C. The source of nickel is constituted by a block of nickel, subjected to electronic bombardment, in order to produce its vaporization. The vaporization flux is equal to 0.020 gram per minute on 1 cm² of the nickel block. The latter is located 18 cm from the substrate. By the condensation of this nickel vapor on the substrate, deposits of nickel having a thickness of 0.9 micron are obtained after 30 minutes of operation of the installation.

In FIG. 1, the variation of the size of the crystallites of the deposit obtained (in Å on the ordinates axis), as a function of the temperature of the substrate (in ° C and on the abscissae axis), is shown. It is observed that this size of the crystallites decreases from a value of the order of 110 Å towards 40° C to 15° Å towards 60° C, this value rising again suddenly towards 105 – 110 Å and becoming approximately stabilized at this value for temperatures above about 60° C.

In FIG. 2, the variations of the lattice parameter (determined by radiocrystallography) of the nickel crystallites (in Å on the ordinates axis) in the deposits obtained, is shown at the function of the deposition temperature (in ° C on the abscissae axis).

As can be seen on examining this Figure, the lattice parameter varies within fairly large proportions, according to the temperature of condensation of the nickel vapor on the substrates, this lattice parameter falling to values below 3.5200 Å, for condensation temperatures comprised between about 50° C and about 130° C, the minimum value of this lattice parameter, in the example concerned: 3.5185 Å, having been observed for the deposits obtained at a temperature of the order of 90° C.

For temperatures outside the above-mentioned range, it is observed that there is a rapid rise again of the lattice parameters measured, towards or even above values of the lattice parameter of well-crystallised solid nickel, of the order of 3.5238 Å.

It is interesting also to note that nickels obtained at a temperature below about 120° C do not permit the solution of hydrogen in their networks. At the most, a surface absorption of hydrogen is observed (not exceeding $1.4 \times 10^{-9}$ moles of hydrogen per m² in the experiments described).

On the other hand, the deposits obtained at temperatures about 120° C are capable of absorbing more hydrogen. They have at the most a microporosity which can reach the scale of the lattice, which microporosity permits, consequently, the solution by the nickel of greater amounts of hydrogen in its crystalline network.

The deposits formed in this example have excellent adherence to the substrates selected. The latter possess an electrical conductivity sufficient for such a substrate covered with such a layer of nickel to be usable as an electrode, more particularly as a negative electrode in a conventional electrochemical measuring cell, in which this electrode is kept in contact with an electrolyte (of N potassium hydroxide in the example concerned), saturated with molecular hydrogen at atmospheric pressure. In manner known in itself, this electrochemical cell is equipped with means enabling the anodic or cathodic polarization of the electrode.

Before carrying out the electrochemical measurements, it should be noted that the surface roughness of the deposits was studies by means of a "Talystep" type rugosimeter. It was thus observed that the true surface of the deposits of catalyst obtained under the above-indicated conditions, that is to say the reactive area capable of coming into contact with the electrolyte, is from six to ten times greater than the apparent surface of these same deposits, which permits, from the measurements made, the determination of the true current densities in the above-said cell obtained under the action of given voltages, applied to such electrodes.

Measurements of the reactive area were made by determining the electrochemical capacity of the double layer; they are in agreement with the specified measurements.

In the experiments, whose results are indicated below, the electrodes constituted by the substrates and their deposits, respectively, have been fixed at the end of an electrode-bearing cylinder, mounted on a spindle rotatable at speeds comprised between 0 and 5000 r.p.m. The placing of the electrode in rotation enables concentration polarizations to be avoided, hence the possibility of revealing the true electrocatalytic properties of the deposits obtained.

It is noted that, for an anodic overvoltage of 50 mV, there are obtained for all deposits of nickel obtained (at condensation temperatures of nickel vapors-fixed by the substrate temperatures —comprised between 30° C and about 180° C), current densities of the order of 10 to 20 microamperes per cm² of these nickels (true surface).

It is first observed that, in all cases, the potential taken up spontaneously by the electrodes, in the presence of molecular hydrogen dissolved in the electrolyte and of $H^+$ protons contained in this electrolyte, is always close to the potential of the reversible ideal hydrogen electrode, namely $-1058$ mV with respect to a saturated calomel electrode (SCE). The nickel deposits according to the invention are hence capable of breaking and oxidising molecular hydrogen molecules into $H^+$ ions. The electrocatalytic activity of the nickel deposits according to the invention tends however to disappear, when the dimensions of the crystallites from which they are constituted increase.

This is clearly shown by subjecting nickel deposits obtained at 60° C to annealing at temperatures of 250°, 350° and 450° C for increasing periods. The initial diameter of the crystallites becomes all the greater as the annealing temperature is higher and as the latter is more prolonged.

It has thus been established that the most active deposits are constituted by crystallites whose dimensions vary between 30 and about 110 Å, this activity then decreasing to disappear completely when the dimensions of the crystallites exceed values of the order of 1000 Å.

In this example, it was also be noted that the deposits obtained at temperatures comprised between about 50° C and 120° C, that is to say, those which have lattice parameters less than 3.5200 Å, had a distinctly improved resistance to oxidation, compared with that of previously known nickel catalysts.

In particular, the test electrodes described above, when they have these reduced lattice parameters, resist fully polarizations of several hours at $-300$ mV/SCE. In fact, these electrodes recover, in some minutes, substantially the reversible potential of hydrogen, as soon as the polarization is interrupted.

On the contrary, the deposits obtained by condensation of the nickel vapors, in vacuum, on substrates brought to temperatures substantially higher than 120° C, tend under the same experimental conditions, no longer to resume their initial potential, after the interruption of the polarization.

The most resistant electrodes are those which have the smallest lattice parameters. This is the case, in the experiments described, of those deposits which have been obtained by condensation on substrates maintained at temperatures of the order of 90° C. As is seen in FIG. 1, their lattice parameter is then of the order of 3.5185 Å.

EXAMPLE II

By working under the same conditions as in Example 1, nickel deposits on vitreous carbon have been formed.

The deposits obtained under these conditions are very active when they are formed on substrates whose temperature is of the order of 90° to 170° C. The lattice parameter of the nickel so obtained is comprised between about 3.5400 and 3.5470 Å and in this case, a lattice parameter variation curve as a function of the temperature of the substrate is obtained having the same shape as the curve shown in FIG. 2, but reversed, that is to say, having a maximum and not a minimum.

By using nickel prepared as in the present example as an electro-chemical oxidation catalyst for hydrogen, it is observed that for an overvoltage of 50 mV and a hydrogen pressure ($P = 1$), a current of the order of 25 $\mu$A per cm$^2$ of real surface (measurements carried out by means of an experimental device similar to that of Example 1) is obtained.

"Annealing" for 3 hours at 250° C of the catalyst prepared by the method of Example I, gives it an improved behaviour with respect to anodic oxidation.

EXAMPLE III

A deposit of nickel on a glass substrate, under the conditions described in Example 1, at a temperature of the order of 90° C, is produced. The nickel obtained is then recovered by scraping. 30 mg of this nickel are then mixed with 20 mg of carbon black and 0.15 cm$^3$ of a polytetrafluorine emulsion of the "TEFLON T 30" type.

The mixture is pressed into a compact mass on a current collector, constituted by a nickel grid, the assembly then constituting an electrode, whose performance is examined in a measuring cell. It is observed that this electrode gives rise, when it is placed in contact with an electrolyte constituted by 5 N potassium hydroxide at 25° C, to the production of a current of 8 mA, under an anodic overvoltage 100 mV.

The performances obtained support comparison with those of platinum, since in a test carried out by way of comparison with one electrode, in which the 30 mg of nickel were replaced by 60 mg of platinum black, a current of 13 mA was obtained under the same experimental conditions.

The electrocatalytic activity of the nickel, even if it is not as good as that of platinum, approaches it none-the-less very closely. It is naturally clear that the difference in activity may be compensated by an increase in the amount of nickel-based catalyst used, without considerable differences in price resulting therefrom and without posing the problem of availability of raw materials.

EXAMPLE IV

The object in this example was to manufacture an active nickel-based catalyst, having a greater specific surface than that obtained under the conditions mentioned in the Example 1.

As in Example 1, a sealed vacuum enclosure ($10^{-5}$ to $10^{-6}$ torr) was used. A block of nickel was heated by an electron gun, to produce nickel vapor. The latter was condensed on an aluminum support located at about 15cm from the point of impact of the electrons on the block of nickel, this support being kept at a temperature comprised between 70° and 100° C. At the end of this operation, a nickel deposit whose thickness was of the order of 75 Å was obtained on the piece of aluminum.

The part thus obtained was dipped into a concentrated solution of potassium hydroxide (5 to 7 N) kept at 50° C. After the aluminum had passsed into solution, the anodic nickel was recovered in the form of a powder constituted by flaky particles having dimensions of the order of 500 Å. Each of these particles contained itself a plurality of crystallites. The specific surface of these particles was found to be of the order of 20 m$^2$ per gram.

30 mg of this powder, previously washed and dried, were mixed with 10 mg of carbon black and 0.05 ml of a suspension of tetrafluorethylene, known by the trademark "TEFLON 30". This mixture was then applied on to a porous web of polytetrafluorethylene or TEFLON, of the so-called "millipore" type. The assembly was then pressed under a pressure of 40 kg per cm$^2$, onto a nickel grid adapted to play the role of a current collector, in the form of an electrode of 1 cm$^2$ apparent surface. The electrode thus obtained was subjected to tests in a test cell, in contact with an electrolyte constituted by 5 N potassium hydroxide, at 25° C, and into which hydrogen was supplied (on the TEFLON web side), at an overpressure of 5 g per cm$^2$.

It was observed that the current density delivered by an experimental cell working with this electrode was 50 mA/cm$^2$, at an anodic overvoltage of + 100 mV.

We claim:

1. An electrode for an electrochemical generator enabling electrochemical oxidation of hydrogen in contact with it, comprising an electrically-conducting support and a nickel-containing catalyst deposited thereon or incorporated therewith, said nickel-containing catalyst being formed of crystallites having sizes ranging from about 20 to about 130 Å and being at most reversibly oxidizable under the action of an anodic overvoltage of −300 mV and taking up spontaneously a potential sufficiently close to that of a reversible ideal hydrogen electrode with respect to an electrolyte solution saturated with molecular hydrogen to be capable of electrochemically breaking and oxidizing molecular hydrogen into hydrogen ions, H$^+$.

2. An electrode according to claim 1, wherein the nickel-based catalyst is formed of particles or crystallites having sizes ranging from about 30 to about 120 Å.

3. An electrode according to claim 1, wherein the lattice parameter of the nickel in the catalyst ranges from about 3.5170 Å to 3.5210 Å.

4. An electrode according to claim 3, wherein the lattice parameter of the nickel of the catalyst is less than 3.5200 Å.

5. An electrode according to claim 4, wherein the lattice parameter of the nickel of the catalyst ranges from about 3.5185 Å to about 3.5195 Å.

6. An electrode according to claim 1, wherein the lattice parameter of the nickel of the catalyst ranges from about 3.5400 Å to about 3.5470 Å.

7. An electrode according to claim 6, wherein the electrically-conducting support is of vitreous carbon.

8. An electrode according to claim 1, wherein the catalyst is deposited on a substrate brought to a temperature ranging from about 50° to 120°–130° C.

9. An electrode according to claim 1, wherein the catalyst is deposited on a substrate of vitreous carbon brought to a temperature ranging from about 90° to about 170° C.

10. An electrode according to claim 8 wherein the catalyst has also undergone, annealing.

11. An electrode for an electrochemical generator enabling electrochemical oxidation of hydrogen in contact with it, comprising an electrically-conducting support and a catalyst consisting essentially of nickel deposited thereon or incorporated therewith, said catalyst consisting essentially of nickel being formed of crystallites having sizes ranging from about 20 to about 130 Å and being at most reversibly oxidizable under the action of an anodic overvoltage of $-300$ mV and taking up spontaneously a potential sufficiently close to that of a reversible ideal hydrogen electrode with respect to an electrolyte solution saturated with molecular hydrogen to be capable of electrochemically breaking and oxidizing molecular hydrogen into hydrogen ions, $H^+$.

12. An electrochemical generator, constituted by one or several cells, wherein said cells comprise electrodes according to claim 1.

13. An electrode according to claim 1 which has the property of recovering the reversible potential of hydrogen after subjection of said electrode to a polarization of $-300$ mV and an interruption thereof.

14. An electrochemical generator, constituted by one or more cells, wherein said cells comprise electrodes according to claim 2.

15. An electrochemical generator, constituted by one or more cells, wherein said cells comprise electrodes according to claim 1.

16. An electrochemical generator, constituted by one or more cells, wherein said cells comprise electrodes according to claim 3.

17. An electrochemical generator, constituted by one or more cells, wherein said cells comprise electrodes according to claim 4.

18. An electrochemical generator, constituted by one or more cells, wherein said cells comprise electrodes according to claim 5.

19. An electrochemical generator, constituted by one or more cells, wherein said cells comprise electrodes according to claim 6.

20. An electrochemical generator, constituted by one or more cells, wherein said cells comprise electrodes according to claim 7.

21. An electrochemical generator, constituted by one or more cells, wherein said cells comprise electrodes according to claim 8.

22. An electrochemical generator, constituted by one or more cells, wherein said cells comprise electrodes according to claim 9.

23. An electrochemical generator, constituted by one or more cells, wherein said cells comprise electrodes according to claim 10.

* * * * *